Sept. 25, 1945.  C. O. COZZENS ET AL  2,385,693
OPHTHALMIC MOUNTING
Original Filed Feb. 27, 1940   2 Sheets-Sheet 1
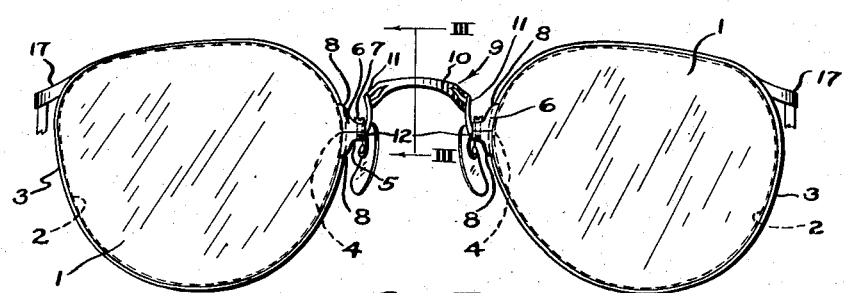
Fig. I
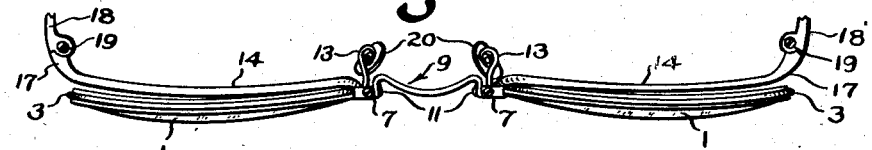
Fig. II
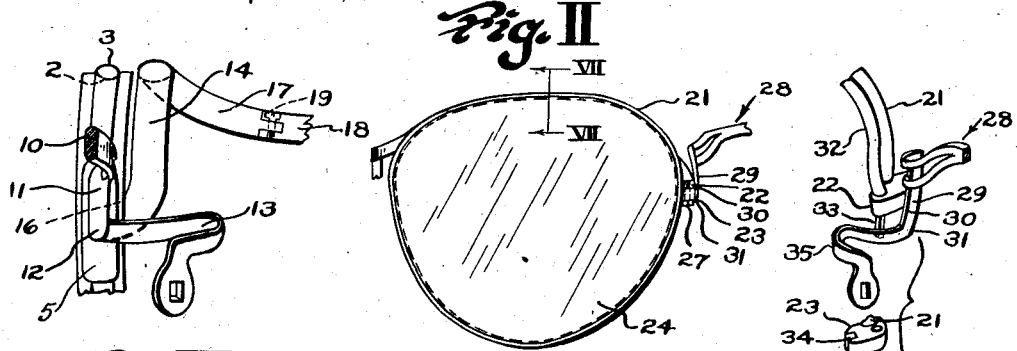
Fig. III   Fig. IV   Fig. V
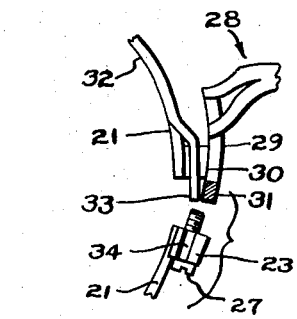
Fig. VI
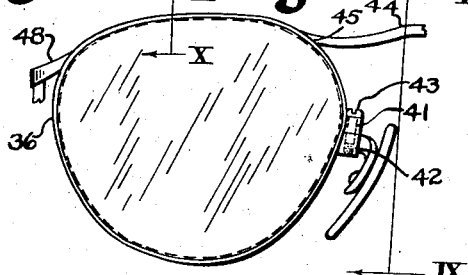
Fig. VIII
INVENTOR
CHARLES O. COZZENS
EDWARD M. SPLAINE
BY
ATTORNEY Sept. 25, 1945. C. O. COZZENS ET AL 2,385,693
OPHTHALMIC MOUNTING
Original Filed Feb. 27, 1940 2 Sheets-Sheet 2
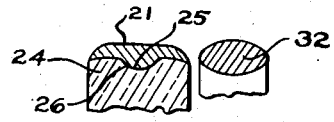
Fig. VII
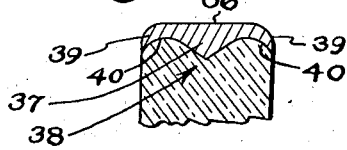
Fig. X
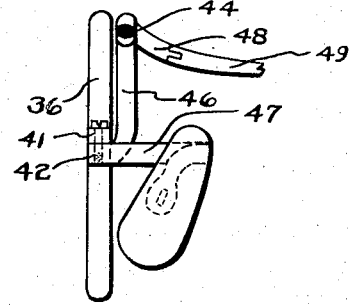
Fig. IX
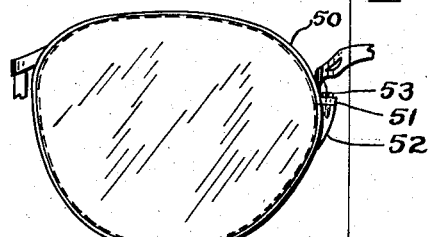
Fig. XI
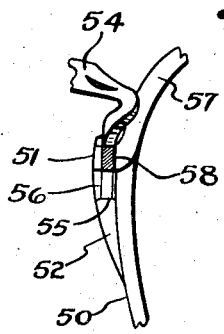
Fig. XIII
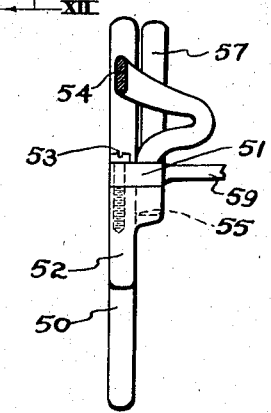
Fig. XII
INVENTOR
CHARLES O. COZZENS
BY EDWARD M. SPLAINE
ATTORNEY Patented Sept. 25, 1945

2,385,693

UNITED STATES PATENT OFFICE 2,385,693

OPHTHALMIC MOUNTING

Charles O. Cozzens and Edward M. Splaine, Southbridge, Mass., assignors to American Optical Company, Southbridge, Mass., a voluntary association of Massachusetts Original application February 27, 1940, Serial No. 321,081. Divided and this application February 26, 1943, Serial No. 477,206

5 Claims. (Cl. 88—41)

This invention relates to ophthalmic mountings and has particular reference to an improved construction of mounting.

This application is a division of our copending application Serial No. 321,081 filed February 27, 1940, issued as Patent Number 2,356,148 on August 22, 1944.

One of the principal objects of the invention is to provide an ophthalmic mounting of the type having lens supporting rims encircling the lenses whereby the said rims will be relatively inconspicuous and substantially invisible when in assembled relation with the lenses and to provide a relatively rigid and adjustable supportng structure for said lenses and rims.

Another important object is to provide an ophthalmic mounting of the above character with combined lens supporting rims and relatively long and slender adjustable temple supports shaped to follow substantially the upper portions of said rims whereby the said rims will be relatively inconspicuous or substantially invisible when in assembled relation with the lenses and the said temple supports will also be substantially invisible when the mounting is on the face.

Another object is to provide a mounting of the above character with divided lens supporting rims having connecting means adjacent the divided ends thereof cooperating with a part of the relatively rigid and adjustable supporting structure to aid in retaining said associated parts in desired assembled relation with each other.

Another object is to provide novel arrangements for joining the dividing portions of the lens supporting rims whereby the joining means will be relatively inconspicuous in the completed mounting and in many instances will afford means for retaining the parts in desired relation with each other during the use of the mounting.

Another object is to provide various different constructions whereby the said rims will be relatively inconspicuous or substantially invisible during use.

Another object is to provide an ophthalmic mounting of the above character with novel means for joining the meeting ends of the divided lens rims of the mounting and relatively long and slender temple supports having portions in cooperative relation with end means for joining the meeting ends of the lens rims and retaining said relatively long and slender temple supports in desired relation with said rims.

Another object is to provide an ophthalmic mounting of the above character with lens supporting means which do not necessitate the forming of connection openings in the lenses and to provide a relatively rigid and durable supporting structure for said lens holding means and lenses which may be adjusted to the facial requirements of different individuals.

Other objects and advantages of the invention will become apparent from the following description taken in connection with the accompanying drawings and it will be apparent that many changes may be made in the details of construction and arrangement of parts shown and described without departing from the spirit of the invention as set forth in the accompanying claims. We, therefore, do not wish to be limited to the exact arrangement of parts and details of construction shown and described as the preferred forms only have been given by way of illustration.

One of the most desirable types of ophthalmic mountings is a mounting having rim members shaped to fit about the contour edges of the lenses for supporting said lenses in assembled relation with the mounting. Such rims, however, in most instances in the past, and in order to obtain the strength and durability required, were formed of relatively heavy rim members. The use of heavy rim members was inherently necessary because of the fact that it has been usual in the past to connect the associated parts of the mounting, such as the bridge members, nose pad supporting arms and temple supports to the rims. The rims, therefore, had to be sufficiently rigid and durable so as to permanently support the parts in adjusted relation with each other. Some attempts have been made to reduce the cross-sectional size of the lens rims. This would overcome the bulky appearance of the mounting but, because of the fact that the associated parts of the mounting were connected directly to said rims an exceedingly weak and fragile construction resulted.

Because of the fact that the associated parts of the mounting, such as the bridge or nose pad supporting arms and temple supports, were secured directly to the rims, adjustment of the parts without distortion of the rims was exceedingly difficult and such adjustments were also greatly limited in scope. It, therefore, is one of the primary objects of this invention to provide an ophthalmic mounting having lens supporting rims encircling the lenses whereby the said rims may be reduced in cross-section so that when in assembled relation with the lenses, they will be relatively inconspicuous and substantially invisible and to provide a supporting structure for said rims and lenses which has a wide latitude of adjustment and which will rigidly and durably retain the lenses, as well as the associated parts of the mounting, in desired adjusted relation with each other and which will overcome all of the above difficulties while maintaining the advantages of prior art rim type mountings.

One of the advantages of rim type constructions is that it avoids the necessity of forming connection openings in the lenses which, in the past, caused a great loss of lenses due to fracture either during the forming of connection openings in the lenses, or during the connection of lens straps to the lenses or due to breakage during use.

Referring to the drawings:

Fig. I is a front elevation of an ophthalmic mounting embodying the invention;

Fig. II is a plan view of a mounting illustrated in Fig. I;

Fig. III is a sectional view taken as on line III—III of Fig. I looking in the direction indicated by the arrows;

Fig. IV is a fragmentary front elevation of a modified form of the invention;

Fig. V is a fragmentary perspective view of the construction illustrated in Fig. IV showing the parts disunited;

Fig. VI is a front view of the arrangement illustrated in Fig. V;

Fig. VII is an enlarged sectional view taken as on line VII—VII of Fig. IV;

Fig. VIII is a view generally similar to Fig. IV of a further modification;

Fig. IX is a view taken as on line IX—IX of Fig. VIII and looking in the direction indicated by the arrows;

Fig. X is an enlarged fragmentary sectional view taken as on line X—X of Fig. VIII;

Fig. XI is a view generally similar to Fig. VIII of a further modification;

Fig. XII is a view taken as on line XII—XII of Fig. XI looking in the direction indicated by the arrows; and Fig. XIII is a rear elevation of the construction illustrated in Figs. XI and XII.

Referring more particularly to the drawings wherein like characters of reference designate like parts throughout the several views, the device embodying the invention, as illustrated in Figs. I to III inclusive, comprises a pair of lenses 1 each having relatively shallow grooves 2 formed throughout the contour edge thereof. The said grooves 2 are adapted to receive relatively slender lens rims 3 which are so dimensioned as to cross-sectional size as to lie substantially entirely within the grooves 2 so as to be relatively inconspicuous and substantially invisible when in assembled relation with said lenses. Each of the rims 3 is divided, as illustrated at 4, and the divided ends thereof are provided with lugs 5 and 6 adapted to be connected by a screw or the like 7. The lugs 5 and 6 are each provided with a tongue 8 having a relatively long surface bearing on the adjacent ends of the divided lens rims 3 and secured to said rims as by soldering, welding or the like. The purpose of the tongues 8 is to increase the area of connection between the rims and the lugs. The said lugs 5 and 6 have aligned openings therein to receive the connecting means 7. The dimension of the opening of the lug 6 is such that the connecting means or screw 7 may be extended through said lug 6 and the bore of the opening in the lug 5 is threaded so as to receive the threaded portion of the connecting means or screw 7. The lenses are placed in the respective rims by backing out the connecting means or screw 7 so as to permit each rim to be fitted within the groove 2 in the contour edge of the lens. The lugs 5 and 6 are then drawn together by the connection means 7 to tightly bind the rim on the lens. A bridge member 9 having a central arch portion 10 and depending side portions 11, is secured to the lugs 5 by soldering or welding the ends 12 of said depending side portions to said lugs. Rearwardly extending nose pad supporting arms 13 are also secured to the lugs 5 adjacent the connection of the ends 12 to said lugs. This arrangement leaves the lugs 6 free to separate from the lugs 5 so as to permit the lenses 1 to be inserted in the rims 3. The supporting structure is provided with relatively long and slender temple supports 14 which have an end 16 attached to the nose pad supporting arm 13 and to the lug 5, as illustrated in Fig. III. The relatively long and slender temple supports 14 are shaped to follow substantially the upper contour edges of the lenses and are provided without outwardly and rearwardly extending temple connection ends 17 to which suitable temples 18 are pivotally attached, as illustrated at 19. The relatively long and slender temple supports 14, as illustrated in Figs. I to III inclusive, are preferably shaped to lie in the rear of the upper contour edge of the lens so as to be substantially invisible when the mounting is viewed from the front but it is to be understood that the said supports 14 may be shaped to follow the upper contour edges of the lenses in the plane of said lenses or may be shaped to lie in front of the plane of said lenses as desired. The relatively long and slender temple supports 14 are formed of bar-like metal having a much larger cross-sectional dimension than the cross-sectional dimension of the lens rim 3 so as to have increased strength and rigidity. The said arms, although relatively rigid, may be adjusted and because of the rigidity thereof will tend to retain said adjustments. The depending portions 11 of the bridge 9 are also formed of relatively rigid material so as to increase the strength of the bridge at said localities. The central arch portion 10 may be formed rigid or resilient or may have a portion thereof formed rigid and another portion formed resilient. The construction is such that the supporting parts of the mounting, including the bridge member 9, nose pad supporting arms 13 and relatively long and slender temple supports 14 are all rigidly joined with each other and provide adjustable means which has sufficient rigidity for permanently retaining said adjustments so as to more positively support the lenses 1 in desired spaced relation with each other. The relatively long and slender temple supports 14 and temple connection ends 17 provide means having a relatively wide range of adjustment for supporting the temples 18 and for permitting said temples to be adjusted up or down, or in or out, to meet the requirements of the individual for whom the mounting is being formed. Because of the fact that the temple supports 14 are formed of relatively rigid material as compared with the lens rims 3 and are secured adjacent the connection of the bridge member 9 to the lugs 5 any flexing strain directed to said supports 14 will be transmitted to the bridge 9 and will thereby relieve the lenses 1 and rims 3 from said strain. The relatively long and slender temple supports 14, bridge 9 and associated lugs 5, when in united relation with each other, provide an effectively continuous support throughout the width of the mounting. The rims 3, because of their connection with the lugs 5 and 6, afford positive and durable means for retaining the lenses in desired relation with the main supporting structure of the mounting. Due to the fact, that the rims have a relatively small cross section and are fitted within grooves formed throughout the contour edges of said lenses, they will be relatively inconspicuous and substantially invisible during use.

The rearwardly extending temple connection ends 17 are preferably located above the useful field of side vision or above the centers of the pupils of the eyes when the mounting is in position on the face of the wearer. The central arch portion and depending side portions of the bridge afford means of adjustment whereby the distance between the centers of the lenses may be changed. The rearwardly extending nose pad supporting arms 13 provide means whereby the nose bearing pads 20 carried thereby may be adjusted to fit the nose of the wearer.

In making, assembling and fitting a mounting of the above character to the requirements of an individual suitable lenses 1 having the prescriptive requirements of the individual are edged to size and shape and are provided with a peripheral groove 2 substantially centrally of the contour edge thereof. The lenses are then secured within the lens rims 3 as set forth above. The bridge member 9 is then adjusted to move the lenses to desired spaced relation with each other, as required by the individual, and to position the lenses in desired aligned relation with each other. The relatively long and slender temple supports are then adjusted to follow substantially the upper contour edges of the lenses. The nose pad supporting arms 13 are then adjusted to fit the nose pads to the nose of the wearer and to support the lenses in desired position before the eyes of the wearer. The temple connection ends 17 are then bent upwardly or downwardly to dispose the temples in a desired angular relation with respect to the plane of the lenses when the said temples are extended. The said temple connection ends 17 are then bent inwardly or outwardly to space the temples to the requirements of the individual. It is to be noted that the adjustment of the nose pad supporting arms 13 may be made independently of the bridge, that is, without altering the adjustment of the bridge and the adjustment of the relatively long and slender temple supports 14 and the temple connection ends 17 may be made without altering the adjustment of the nose pad supporting arms 13. With this arrangement, it is not necessary to form any connection openings in the lenses. Although the assembly of the bridge member, nose pad supporting arms and relatively long and slender temple supports has been described as being made with the lugs 5, it is to be understood that the said assembly may be made with the lug 6 if desired.

In Figs. IV to VII inclusive there is illustrated a modified form of the invention comprising divided lens rims 21 having connection lugs 22 and 23 adjacent the meeting ends of said rims. The rims 21, as shown in Fig. VII, are formed of relatively thin ribbon-like material shaped to follow the contour edges of the lenses 24 and to extend substantially the full width of said contour edges. The said rims 21 are provided with an internal circumferential rib or bead 25 shaped to lie within a groove 26 extending throughout the contour edge of the lens. The rim 21 is so controlled as to thickness as to be substantially invisible when in assembled relation with the lenses. The lugs 22 and 23 are connected by a screw 27 or other suitable connecting means known in the art. The bridge 28 has depending side portions 29 secured to the lugs 22 as by soldering, welding or the like, as illustrated at 30. The side portions 29 extend downwardly, as illustrated at 31, to form a channel like recess between the edge of the lens and the said depending portion 29 in which the lug 23 is fitted when the parts are being positioned and secured when in assembled relation with each other by the connecting means 27. The ends 31 provide guide means for directing the lug 23 into aligned relation with the lug 22 when the said lugs are being united by the connecting means 27. Relatively long and slender temple supports 32 simulating the temple supports 14 are secured to the lugs 22 and each has an end 33 extending downwardly and shaped to fit within a slot 34 formed in the rear of the lug 23. This also provides guide means for aligning the lugs with each other when the lenses 24 are being secured within the lens rims 21. The ends 31, as shown in Fig. V, provide means to which suitable nose pad supporting arms 35 are attached as by soldering, welding or the like. It is to be understood, however, that the said nose pad supporting arms 35 may be connected to the lug 22 or to the lug 23 as desired.

In Fig. VIII there is illustrated another modification wherein the lens rims 36 are formed of relatively thin ribbon-like material having an internal bevelled lip 37, shown in Fig. X, fitting within a V-shaped groove 38 formed on the contour edge of the lens. The edges of the rim 36, as illustrated at 39, are turned inwardly and the lens is provided with edges 40 shaped to fit said inturned edges 39. It is to be understood, however, that the main ribbon-like portions or rims 36 may be formed flat with the edges of the lenses having a similar flat surface on the opposed sides of the V-groove 38, if desired. The rims 36 are divided and are provided adjacent the meeting ends thereof with connection lugs 41 and 42. The said lugs are secured to the ends by soldering, welding or the like. The lugs are drawn together by connecting means, such as a screw or the like 43. The bridge 44 is secured adjacent its opposed ends to the rim 36, as illustrated at 45, as by soldering, welding or the like and is of the commonly known bar-type bridge. The ends of the bridge are tapered so as to blend with the outer contour surface of the rims. Relatively long and slender temple supports 46, shaped to follow substantially the upper contour shape of the rims, are secured as illustrated in Fig. IX to the lug 42. The said lug also has rearwardly extending nose pad supporting arms 47 secured thereto. It is to be noted that the said temple supports 46 and nose pad supporting arms 47 may be secured to the lug 41 if desired. The said relatively long and slender temple supports 46 are provided with outwardly and rearwardly extending temple connection ends 48 to which suitable temples 49 are pivotally attached. The rim 36, in this instance, is formed relatively thin so as to be substantially invisible and inconspicuous during use.

In Figs. XI to XIII there is illustrated another modification wherein a rim 50 similar to the rim 36 is provided adjacent the divided ends thereof with lugs 51 and 52. The lug 52 is tapered downwardly so as to blend into the contour shape of the rim. The said lug 52 is provided with a threaded bore to receive the connecting screw or the like 53. The bridge 54 is secured to the lug 51 and has an end 55 extending downwardly and fitting within a slot 56 formed in the rear of the lug 52. The portion 55 fitting within the slot 56 provides means for guiding the lugs 51 and 52 into alignment with each other so as to align the connection openings therein for the reception of the connection means or screw 53. The relatively long and slender temple supports 57 are secured, as illustrated at 58, to the lug 51. The rearwardly extending nose pad supporting arms 59, similar to the arms 47, are also secured to the rear of the lug 51. If desired, the relatively long and slender temple supports 57 may be secured to the nose pad supporting arms 59 or may have portions thereof secured to the arms 59 and to the lugs 51, as desired.

Although applicant has shown the groove 26 as having a circular contour and the groove 38 as having a V-shape it is to be understood that any suitable shape of groove may be formed and that the rib, such as illustrated at 25 or 37, is to be shaped to fit said groove.

In all of the above constructions, the various lens supporting rims are formed so as to be as inconspicuous as possible and yet function properly to support the lenses. The relatively long and slender temple supports are formed to permit adjustment and yet rigidly retain the shape to which they are adjusted. The said supports may be formed of rigid or resilient material or may have a portion thereof formed rigid and another portion formed resilient but in all instances are such that they will permit adjustment. The bridge member for joining the temple supports or for joining the lens supporting rims may be made of any desired shape or design and may be so constructed as to be adjustable either with the use of rigid or resilient materials or with material having a portion thereof rigid and another portion resilient.

It is to be understood that the connecting means for the lens rim may be positioned at any desired location on the lens rim, depending, of course, upon the characteristics of the construction. It is also to be understood that the various different constructions of lens rims may be used with any of the supporting structures and vice versa.

The general method of making, assembling and fitting applies to all the various constructions set forth above. It is also to be understood that any known type of connecting means may be employed, such as the screw, pin, rivet, solder connected members, and so forth, to secure the connecting lugs together. Several of the associated parts may also be formed in integral relation with each other, instead of being formed separate and joined with each other as by soldering, welding or the like.

From the foregoing description, it will be seen that simple, efficient and economical means have been provided for accomplishing all of the objects and advantages of the invention.

We claim:

1. A supporting structure for the lenses of an ophthalmic mounting each having a peripheral groove therein, said lens supporting structure comprising lens rims each having an inner surface portion shaped to lie within the groove of a respective lens when assembled therewith and each having divided end portions adjacent the nasal sides thereof, a connecting lug adjacent each of the divided end portions, each of said lugs having a portion disposed in the plane of the rim and an integral portion disposed in the rear of the plane of the rim with one of said lugs having a recess, means for securing said connecting lugs together, relatively long and slender bar-like temple supports each shaped substantially to follow the upper contour shape of the lens rims with the nasal ends thereof connected to one of said lugs and adjacent their temporal ends having a portion extending rearwardly and terminating in a temple hinge connection and a bridge member secured to one of said lugs and having a portion projecting outwardly of said lug and extending within the recess of said recessed lug when the said lugs are in connected relation with each other.

2. A supporting structure for the lenses of an ophthalmic mounting each having a peripheral groove therein, said lens supporting structure comprising lens rims each having an inner surface portion shaped to lie within the groove of a respective lens when assembled therewith and each having divided end portions adjacent the nasal sides thereof, a connecting lug adjacent each of the divided end portions, each of said lugs having a portion disposed in the plane of the rim and an integral portion disposed in the rear of the plane of the rim with one of said lugs having a recess, means for securing said connecting lugs together, relatively long and slender bar-like temple supports each shaped substantially to follow the upper contour shape of the lens rims with the nasal ends thereof connected to one of said lugs and adjacent their temporal ends having a portion extending rearwardly and terminating in a temple hinge connection and a bridge member secured to one of said lugs and having a portion projecting outwardly of said lug and extending within the recess of said recessed lug when the said lugs are in connected relation with each other, said lug to which the bridge is secured having an adjustable nose pad supporting arm connected thereto.

3. A lens supporting structure for the lenses of an ophthalmic mounting, said lens supporting structure comprising lens rims each having an inner surface portion shaped to receive a respective lens when assembled therewith and each having divided end portions adjacent the nasal sides thereof, a connecting lug adjacent each of the divided end portions of said rims, each of said lugs having a portion disposed in the plane of the rim and an integral portion extending rearwardly of the plane of the rim with one of said portions lying above the other and with the lower portion having a recess therein, means disposed substantially in the plane of the rim for securing said connecting lugs together, relatively long and slender bar-like temple supports each shaped substantially to follow the upper contour shape of the lens rims with the nasal ends thereof connected to the respective rearwardly extending integral portions of the upper lugs and provided on their temporal ends with a portion extending rearwardly and terminating in a temple hinge connection and a bridge member secured to the upper lug and having an integral portion projecting outwardly of said lug and extending within the recess of said recessed lug when the said lugs are in connected relation with each other.

4. A lens supporting structure for the lenses of an ophthalmic mounting each having an edge portion of controlled shape, said lens supporting structure comprising lens rims each shaped to receive said lenses when assembled therewith and each having divided end portions adjacent the nasal sides thereof, a connecting lug adjacent each of the divided end portions one above the other substantially in the plane of the rims, the lower of said lugs being longer than the upper of said lugs and shaped to follow the contour of the adjacent portion of the rim with the lower end thereof blending into the contour of said rim, each of said lugs having an integral portion extending rearwardly of the plane of the rim with the integral portion of the lower lug being shorter than said lug in the direction of the rim and having a recess therein, means disposed substantially in the plane of the rim for securing said lugs together, relatively long and slender bar-like members each shaped substantially to follow the upper contour shape of a respective lens rim with the nasal ends thereof connected to the upper one of said lugs and having temporal end portions terminating in a temple hinge connection and a bridge member secured to the upper one of said lugs and having a portion projecting within the recess of the other of said lugs when the said lugs are in connected relation with each other.

5. An ophthalmic mounting comprising a pair of lenses each having an edge contour of controlled shape and a lens supporting structure for said lenses, said lens supporting structure comprising lens rims surrounding the lenses with said lens rims having divided end portions adjacent the nasal sides thereof, a connecting lug adjacent each of the divided end portions, each of said lugs having a portion disposed substantially in the plane of the rim and an integral portion disposed in the rear of the plane of the rim with one of said lugs having a recess, means for securing said connecting lugs together, relatively long and slender bar-like temple supports shaped substantially to follow the upper contour shape of the lens rims with the nasal ends thereof connected to one of the portions of said lugs disposed in the rear of the plane of the rim and having temporal end portions terminating in a temple hinge connection and a bridge member secured to one of said lugs and having a portion projecting outwardly of said lugs and extending within the recess of said recessed lug.

EDWARD M. SPLAINE.
CHARLES O. COZZENS.